United States Patent [19]

Yokocho et al.

[11] Patent Number: 4,586,322
[45] Date of Patent: May 6, 1986

[54] GRASS TRIMMER

[75] Inventors: Yoetsu Yokocho, Ome; Hiroyuki Tanaka, Tanashi, both of Japan

[73] Assignee: Kioritz Corporation, Tokyo, Japan

[21] Appl. No.: 714,521

[22] Filed: Mar. 21, 1985

[30] Foreign Application Priority Data

Mar. 29, 1984 [JP] Japan .................. 59-45356[U]

[51] Int. Cl.⁴ .................. A01G 3/06; A01D 34/63
[52] U.S. Cl. .................. 56/12.7; 30/276
[58] Field of Search .............. 56/12.7; 30/276, 347, 30/296

[56] References Cited

U.S. PATENT DOCUMENTS

| | | | |
|---|---|---|---|
| 4,062,115 | 12/1977 | Lee | 30/276 |
| 4,086,700 | 5/1978 | Inada | 30/276 |
| 4,176,508 | 12/1979 | Baumann | 30/276 |
| 4,226,021 | 10/1980 | Hoff | 56/12.7 |
| 4,287,670 | 9/1981 | Baker | 56/12.7 |
| 4,366,622 | 1/1983 | Lombard | 56/12.7 |
| 4,476,632 | 10/1698 | Proulx | 56/12.7 |

Primary Examiner—Paul J. Hirsch
Attorney, Agent, or Firm—Sheridan Neimark

[57] ABSTRACT

A grass trimmer has a support which supports a portion of a control rod on the side thereof which is closer to a prime mover in such a manner that the portion is received inside the support and which rotatably supports the output shaft of a clutch for coupling a transmission shaft received inside the control rod. The support is constituted by an integral tubular member and receives a vibration damping sleeve therein. Two semi-cylindrical fixing members are provided in opposed relation to each other inside a portion of the vibration damping sleeve on the side thereof from which the control rod is inserted.

1 Claim, 4 Drawing Figures

GRASS TRIMMER

BACKGROUND OF THE INVENTION

The present invention relates to a grass trimmer having a support which supports a portion of a control rod on the side thereof which is closer to a prime mover in such a manner that the portion is received inside the support and which rotatably supports the output shaft of a clutch for coupling a transmission shaft received inside the control rod.

One type of conventional grass trimmer has been arranged such that the above-described support is constituted by semi-cylindrical halves obtained by axially halving a cylindrical support member and the control rod is fixed to the support through a vibration damper. Such a conventional grass trimmer, however, suffers the following disadvantages. It is inconveniently difficult to effect centering of parts, such as the alignment of the control rod and the transmission shaft, with respect to the output shaft of the clutch when they are assembled, and it is disadvantageously necessary for each of the parts to be produced with high accuracy. Further, even a grass trimmer which incorporates an integral support unfavorably involves a troublesome and labor-consuming operation when assembling the vibration damping system.

SUMMARY OF THE INVENTION

Accordingly, it is a primary object of the present invention to provide a grass trimmer which overcomes the above-described disadvantages of the prior art and has a vibration damping system with a simplified structure.

To this end, the present invention features the following arrangement. In a grass trimmer of the type described above, the support is constituted by a tubular member. A vibration damping sleeve is received inside the tubular support, and projecting portions which are formed on the outer peripheral surface of the vibration damping sleeve are respectively engaged with bores formed on a peripheral wall portion of the tubular support. A pair of semi-cylindrical fixing members which in combination form a single cylindrical member are received inside the vibration damping sleeve from the side thereof from which the control rod is inserted. Each of the fixing members has cut away portions on both sides of its insertion end portion and further has on its outer peripheral portion a projecting portion which is engageable with a bore formed in the corresponding one of the projecting portions of the vibration damping sleeve. The portion of the control rod on the side thereof which is closer to the prime mover is inserted into the space defined by the fixing members, and the respective outer exposed ends of the fixing members are clamped together, whereby the control rod is fixed to the support.

Thus, according to the arrangement of the present invention, the support is constituted by an integral tubular member and has the vibration damping sleeve received therein, and two semi-cylindrical fixing members are provided in opposed relation to each other inside the vibration damping sleeve on its control rod insertion side such as to fixedly retain the control rod. It is, therefore, possible to extremely easily effect centering of the control rod and the transmission shaft with respect to the output shaft of the clutch, so that the assembly of the grass trimmer is favorably facilitated. Further, it is advantageously possible for a vibration damping system with a simplified structure to effectively perform the vibration insulation between the prime mover and the control rod.

The above and other objects, features and advantages of the present invention will become clear from the following description of the preferred embodiment thereof, taken in conjunction with the accompanying drawings.

DESCRIPTION OF THE PREFERRED EMBODIMENT

The present invention will be described hereinunder through one embodiment with reference to the accompanying drawings.

Figure 1:
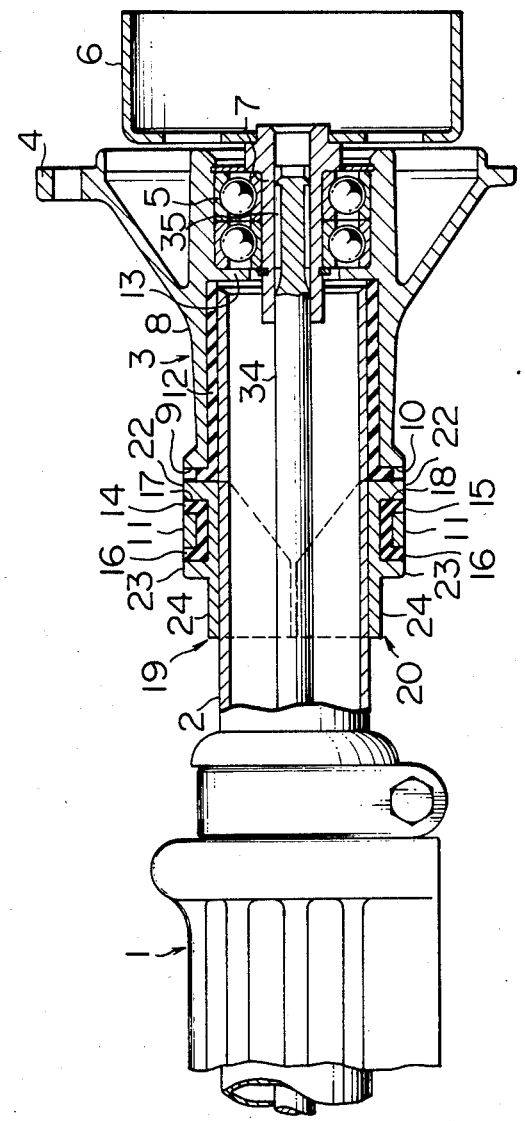
FIG. 1 is a partially cutaway sectional view of an essential portion of the grass trimmer according to the present invention.

Referring first to FIG. 1, there is shown an integrally formed tubular support 3 which supports a portion 2 of a control rod 1 of the grass trimmer according to the present invention, the portion 2 being on the side of the control rod 1 which is closer to a prime mover (not shown) and being received inside the tubular support 3. The tubular support 3 is bolted to the prime mover through a flange portion 4 at one of its ends. Moreover, at the same end, the tubular support 3 rotatably supports an output shaft 7 of a transmission clutch 6 through bearings 5 which are mounted inside the tubular support 3. The support 3 is constituted by two portions, that is, a funnel-shaped portion 8 which is gradually reduced in its outside diameter from the flange portion 4 toward the control rod insertion side of the support 3, and a portion which extends in parallel to the axis of the control rod 1. The support 3 has two bores 9 and 10 formed at portions thereof which diametrically face each other. A peripheral wall portion 11 extending from the bores 9 and 10 to the control rod insertion end of the support 3 has a larger inside diameter than that of the funnel-shaped portion 8.

A vibration damping sleeve 12 of rubber into which the control rod 1 is to be received is fitted to the respective inner peripheries of the funnelform portion 8 and the peripheral wall portion 11 of the support 3. The sleeve 12 has its inner end abutting against the radial inner wall 13 of the support 3 by which the bearings 5 are secured. The sleeve 12 is integrally formed with projecting portions 14, 15 and a peripheral flange portion 16 on its outer periphery. The projecting portions 14 and 15 respectively project into the bores 9 and 10 in the support 3, while the peripheral flange portion 16 abuts against the outer end of the peripheral wall portion 11 of the support 3. Moreover, the projecting portions 14 and 15 are respectively formed with radial bores 17 and 18.

Figure 2:
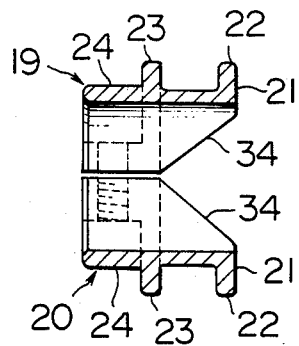
FIG. 2 is a vertical sectional view of fixing members employed in the grass trimmer shown in FIG. 1.

Inside the sleeve 12 and on its control rod insertion end side are mounted a pair of fixing members 19 and 20 in opposed relation to each other, each having a semi-cylindrical shape as a whole. Each fixing member is provided at its axially inner end 21 with a slanting cut away portion 34 in such a manner that only the top central portion of the fixing member remains (see FIG. 2). Further, each fixing member has a projecting portion 22 which projects into the bore 17 or 18 in the sleeve 12, the projecting portion 22 being formed on the outer peripheral surface of each fixing member adjacently to its inner end 21. Moreover, each fixing member has a semi-circular flange portion 23 formed in an intermediate portion on its outer peripheral surface, the flange portion 23 being engageable with the flange portion 16 of the sleeve 12. In assembly, the fixing members 19 and 20 are handled one by one. More specifically, one of the fixing members 19 and 20 is inserted into the sleeve 12 in such a manner that its inner end 21 is slanted toward the axis of the sleeve 12, and the flange portion 23 is engaged with the flange portion 16 of the sleeve 12. Then, the inner end 21 is raised in the radially outward direction such that the projecting portion 22 is fitted into the bore 17 or 18 in the sleeve 12, whereby the fixing member 19 or 20 is brought into close contact with one portion of the inner surface of the sleeve 12. Next, the other fixing member is similarly brought into close contact with the other portion of the inner surface of the sleeve 12. Thus, the fixing members 19 and 20 in combination form a single cylindrical member inside the sleeve 12 for receiving the control rod 1 therein and are connected to the support 3 in such a manner that vibrations are effectively absorbed.

Figure 3:
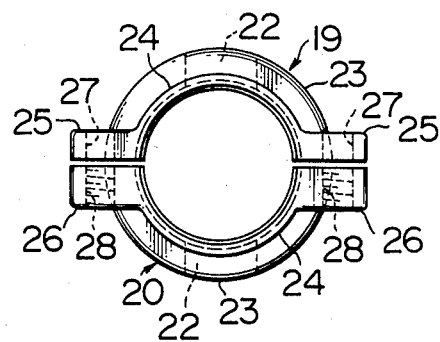
FIG. 3 is an end view of the fixing members shown in FIG. 2.
Figure 4:
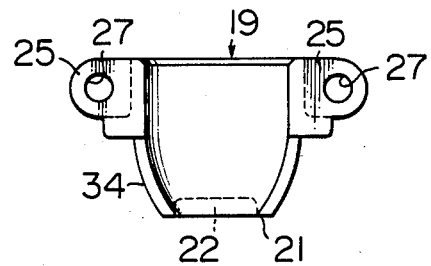
FIG. 4 shows the inner surface of one of the fixing members shown in FIG. 2.

The fixing member 19 has a pair of projecting portions 25 (see FIG. 3) integrally formed at both circumferential ends of its outer exposed end (outer peripheral surface) 24 outward of the flange portion 23. The fixing member 20 also has a pair of projecting portions 26 which are similarly formed on its outer peripheral surface 24. Each of the projecting portions 25 of the fixing member 19 is formed with a bore 27, while each of the projecting portions 26 of the fixing member 20 is formed with a threaded hole 28 which is aligned with the corresponding bore 27.

The control rod 1 is inserted into the tubular support 3 thus formed and assembled in the following manner. The prime mover-side portion 2 of the control rod 1 is passed through the space defined by the fixing members 19, 20 until the distal end of the portion 2 is in close proximity to the inner wall 13 of the support 3. In addition, a spline shaft portion 35 formed at the distal end of a rotary transmission shaft 34 received inside the control rod 1 is engaged to the output shaft 7 of the clutch 6. Then, a pair of bolts (not shown) are respectively passed through the bores 27 in the projecting portions 25 of the fixing member 19, screwed into the threaded holes 28 in the projecting portions 26 of the fixing member 20 and tightened firmly, whereby the control rod 1 is inseparably retained in relation to the support 3 by the fixing members 19 and 20 in such a manner that vibrations are effectively absorbed.

What is claimed is:

1. In a grass trimmer of the type having a support which supports a portion of a control rod on the side thereof which is closer to a prime mover in such a manner that said portion is received inside said support and which rotatably supports an output shaft of a clutch for coupling a transmission shaft received inside said control rod, an improvement characterized by comprising:

an integral tubular support;

a vibration damping sleeve received inside said support;

projecting portions formed on the outer peripheral surface of said sleeve and respectively engaged with bores formed in a peripheral wall portion of said support;

a pair of semi-cylindrical fixing members which in combination form a single cylindrical member, said semi-cylindrical fixing members being inserted into the inside of said sleeve from its control rod insertion end side, each of said fixing members having cut away portions formed on both sides of its insertion end portion and further having on its outer peripheral portion a projecting portion which is engageable with a bore formed in the corresponding one of said projecting portions of said sleeve, wherein said prime mover-side portion of said control rod is inserted into the space defined by said fixing members, and the respective outer exposed ends of said fixing members are clamped together, thereby securing said control rod to said support.

* * * * *